Aug. 11, 1970     H. J. O'SULLIVAN     3,523,697

ANTISKID DEVICE FOR AUTOMOBILES

Filed Sept. 6, 1968

*INVENTOR*
Henry J. O'SULLIVAN

By

*Featherstonhaugh & Co.*

*ATTORNEYS*

United States Patent Office 3,523,697
Patented Aug. 11, 1970

3,523,697
ANTISKID DEVICE FOR AUTOMOBILES
Henry J. O'Sullivan, 3000 Gouin Blvd. W.,
Montreal 12, Quebec, Canada
Filed Sept. 6, 1968, Ser. No. 757,990
Claims priority, application Canada, July 11, 1968
24,910
Int. Cl. B60r 27/00
U.S. Cl. 280—150    3 Claims

ABSTRACT OF THE DISCLOSURE

A device for raising the rear wheels of an automobile by means of a pair of auxiliary wheels which are lowered by hydraulic means, the auxiliary wheels acting to control against skidding of the automobile on ice, snow, mud and wet surfaces.

---

Figure 1:
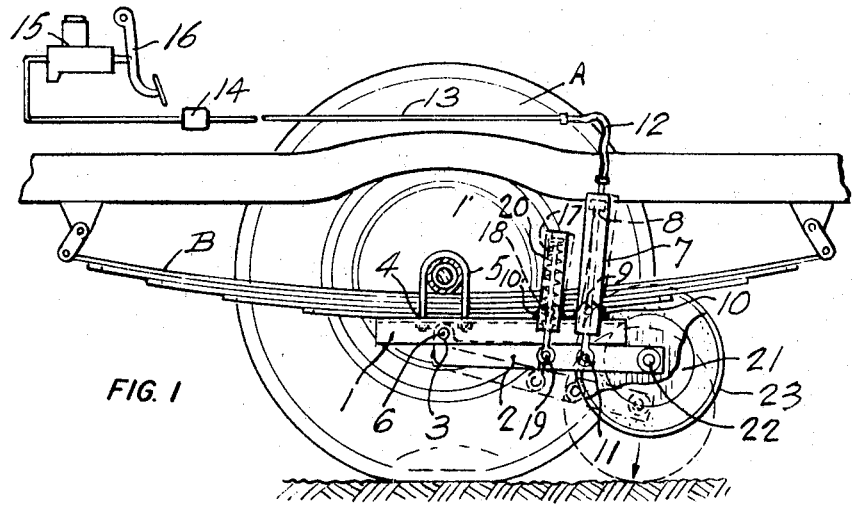

The present invention relates to a mechanism for raising and supporting the rear of a vehicle on two pairs of emergency wheels.

The emergency wheels are mounted in pairs at the rearward end of a pair of movable bars, the other ends of which are pivotally mounted upon bars which are suspended from and fixed in relation to the casing of the rear axle, one such movable bar being located inwardly of each rear wheel in longitudinal alignment with the springs which suspend that rear wheel.

The emergency wheels are normally carried in a retracted position but in the event of an emergency they can be quickly activated by hydraulic means controllable by the vehicle's driver, said hydraulic means functioning to rotate the movable bars carrying the emergency wheels downwardly and forwardly until they take over the supporting role of the vehicle's normal wheels.

I have found that a moving vehicle thus supported by these emergency wheels is surprisingly easy to control against skidding on ice, snow, mud and wet road surfaces; and it is the main object of the present invention to provide a device which can be employed to substantially reduce the hazards of driving on such surfaces.

While my novel device is primarily designed as a safety device for slippery road conditions, the driver of a car equipped with the device will find them useful in many other instances. Thus, for example, the device of my invention replaces a jack when it is desired to change a tire or replace a rear wheel with the "spare wheel"; and, in the event of a blow-out, the rear section could be rolled to a safe position on the emergency wheels, thus avoiding further damage to the blown-out tire.

Also, if the vehicle is stuck in snow, mud, or the like, the rear of the vehicle could be raised and anti-skid material placed under the rear tires to facilitate freeing of the vehicle under its own power.

Also, the emergency wheels may be used when towing the vehicle after a breakdown.

These and other advantages may be enjoyed in the case of a vehicle equipped with the device of my invention which may be generally defined as a device for raising the rear wheels of a vehicle comprising two similar wheeled units symmetrically mounted on the rear axle of the vehicle inwardly of the rear wheels thereof, each unit comprising a bar suspended from the rear axle casing and fixed relative thereto, a movable bar pivotally connected at one of its ends to the fixed bar, said movable bar carrying at its other end a transverse axle, emergency wheels secured to said axle on opposite sides of the movable bar, means normally urging said movable bar into a position in which it bears against the fixed bar and holds the emergency wheels in a retracted position, and hyraulic means operable to force the end of the movable bar carrying said emergency wheels downwardly and forwardly whereby to raise the rear end of the vehicle for support upon said emergency wheels.

The mechanism of the invention will be described in greater detail in connection with the accompanying drawings which show, by way of example, a preferred embodiment of the invention.

Figure 2:
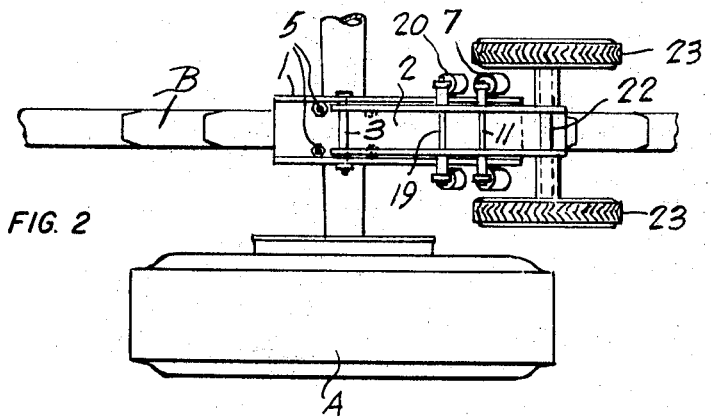
Figure 3:
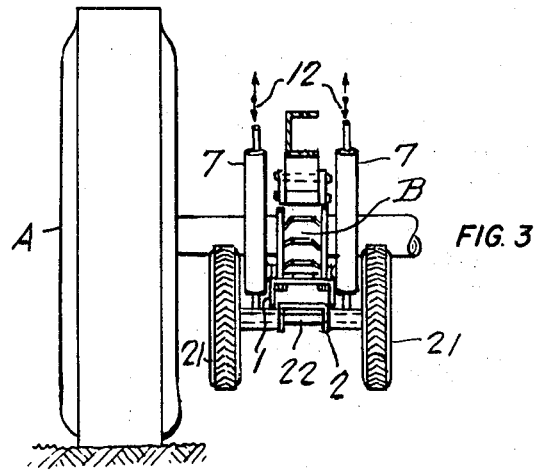

In these drawings:

FIG. 1 is a side elevation of a rearward portion of a vehicle looking toward the inside of one of the rear wheels and showing one of the two similar units according to the invention which are mounted upon the rear axle casing of the vehicle, FIG. 2 is a view of the same embodiment looking upwardly from beneath it, and FIG. 3 is a rear elevation of the embodiment shown in FIGS. 1 and 2.

Turning now to the drawings in detail. A generally indicates one of the rear wheels of the vehicle, B the rear wheel suspension springs of the vehicle, C the rear axle and D the casing for the rear axle. A bar 1 which is of channel or U-shaped configuration is rigidly secured to the rear axle casing by means of U-bolts 4 provided with suitable nuts 5 which tightly draw up the base of the U-shaped bar 1 against the lowermost member of the group of suspension springs B. A second U-shaped bar indicated by reference numeral 2 is pivotally connected to bar 1 by means of a pin 3 which passes through the side walls of U-shaped bar 1.

The U-shaped bar 2 is provided adjacent its free end with a transverse axle 22 at the opposite ends of which are mounted a pair of metal wheels 21. The wheels 21 are preferably made of a tough metal such as speed steel and are preferably provided with hard solid rubber tires 23 carrying steel gripping studs.

The bar 2 is normally held against bar 1, i.e., parallel to and bearing against bar 1, by spring means which bias the bar 2 upwardly. There are two such spring means located on opposite sides of the bar 1. Each spring means consists of a spring casing 20 which is pivotally connected to a lug 10′ at each upper outer edge of the bar 1 at opposite points intermediate its ends. A compression spring 17 is disposed within each spring casing 20 and a rod 18 is pivotally connected at 19 to the movable bar 2 and is connected at its other end to compression spring 17. If the bar 2 carrying the wheels 21 is rotated downwardly and forwardly about its pivot point 3 each of the springs 17 will become further compressed thus urging the bar 2 back to its normal position wherein the wheels 21 are retracted.

Hydraulic means are provided for forcing the end of the bar 2 carrying the wheels 21 to move downwardly and forwardly in the manner indicated in dotted lines in FIG. 1, and further into a position in which the pairs of wheels 21 at the opposite sides of the vehicle will entirely support the rear end of the vehicle. This hydraulic means, in the preferred embodiment illustrated, takes the form of a pair of hydraulic cylinders 7 arranged on opposite sides of the U-shaped bar 2 and pivotally connected at 9 to lugs 10 on opposite sides of the bar 1 near the rearward end of the latter. The hydraulic cylinders 7 contain conventional pistons 8 from which downwardly extend conventional connecting rods 8a. Each of the connecting rods 8a is, at its lower end, pivotally connected to a pin 11, best seen in FIG. 2, extending transversely through the side walls of the movable bar 2.

Hydraulic fluid under pressure is fed to the hydraulic cylinders 9 so as to force the pistons 8 downwardly and, through rods 8a, thus causing clockwise rotation (as viewed in FIG. 1) of the movable bar 2 carrying the wheels 21. The hydraulic fluid flows via lines 13 and 12 to the hydraulic cylinders from a residual pressure valve 14 which, in turn, is connected to the oil reservoir of a master cylinder 15 or can also be connected to the power booster. Flow from the master cylinder is induced by means of a foot pedal 16 or hand lever (not shown) of the lock and release type.

When it is desired to return the emergency wheels 21 to the normal retracted position one simply operates the foot pedal or hand lever (not shown) in a conventional manner to release the pressure in the oil lines leading to the cylinders, whereupon the springs 17, which become greatly compressed during the clockwise rotation of the bar 2, will cause that bar to rotate anti-clockwise about its pivot point 3 until it has been brought to bear against the bar 1.

In the drawings I have shown, by way of example, application of the invention to a vehicle having conventional suspension springs of the leaf type. It will be appreciated by those skilled in the automotive arts that the invention could equally well be utilized in cases where coil spring suspension of the wheels is used. In the latter case, the fixed bar would be rigidly secured either to the rear axle casing itself, or to the coil spring plate support at a point adjacent its point of joinder to the rear axle casing. Just as in the illustrated case, the fixed bar would extend rearwardly in longitudinal alignment with the associated suspension spring.

It will, of course, be appreciated that the device is applicable to trucks as well as cars.

What I claim is:

1. A device for raising the rear wheels of a vehicle comprising two similar wheeled units symmetrically mounted on the rear axle of the vehicle inwardly of the rear wheels thereof, each unit comprising a bar suspended from the rear axle casing and fixed relative thereto, a movable bar pivotally connected at one of its ends to the fixed bar, said movable bar carrying at its other end an axle, emergency wheels secured to said axle on opposite sides of the movable bar, means normally urging said movable bar into a position in which it bears against the fixed bar and holds the emergency wheels in a retracted position, the said means comprising a pair of spring casings mounted on opposite sides of the fixed bar, a spring disposed within each casing, a pair of rods pivotally connected at their lower ends to said movable bar and connected at their upper ends to said springs, said springs being biased to pull said rods upwardly and thus normally hold said movable bar in a position in which it bears against and is generally parallel to the fixed bar, and hydraulic means operable to force the ends of the movable bar carrying said emergency wheels downwardly and forwardly whereby to raise the rear end of the vehicle for support upon said emergency wheels.

2. A device as defined in claim 1, in which the emergency wheels are formed of metal and are provided with solid tires carrying metal studs.

3. A device as defined in claim 1, in which said hydraulic means comprises a pair of hydraulic cylinders pivotally mounted upon the fixed bar on opposite sides thereof, the piston rods of said cylinders extending downwardly and having their lower ends pivotally connected to the movable bar on opposite sides thereof, and means controllable by the operator of the vehicle for supplying fluid under pressure to said cylinders.

References Cited

UNITED STATES PATENTS

| 2,459,508 | 1/1949 | Dourte | 254—86 |
| 3,120,398 | 2/1964 | Butterworth | 280—150 |
| 3,196,969 | 7/1965 | Senzani | 280—150 |

BENJAMIN HERSH, Primary Examiner

ROBERT R. SONG, Assistant Examiner

U.S. Cl. X.R.

254—86